Jan. 31, 1967 W. S. BACHMAN 3,301,565

PHONOGRAPH RECORD REPRODUCING APPARATUS

Filed Aug. 14, 1963 2 Sheets-Sheet 1

INVENTOR.
WILLIAM S. BACHMAN

BY

Brumbaugh, Free, Graves & Donohue his ATTORNEYS

INVENTOR.
WILLIAM S. BACHMAN

BY

Brumbaugh, Free, Graves & Donohue his ATTORNEYS

United States Patent Office 3,301,565
Patented Jan. 31, 1967

3,301,565
PHONOGRAPH RECORD REPRODUCING APPARATUS

William S. Bachman, Southport, Conn., assignor to Columbia Broadcasting System, Inc., New York, N.Y., a corporation of New York
Filed Aug. 14, 1963, Ser. No. 302,025
19 Claims. (Cl. 274—24)

This invention relates to phonograph record reproducing apparatus, and more particularly to a new and improved phonograph apparatus embodying a tone arm arrangement which is effective to provide increased fidelity of reproduction and resistance to external shock.

In phonograph record reproducing apparatus wherein physical modulations of a moving record member induce corresponding vibrations in a reproducing stylus which is supported on a pivoted tone arm so as to engage the record member, the force acting between the stylus and the record member must be kept small to minimize wear of both the record member and the stylus. Usually, the free-end and mass of the tone arm provides the engaging force between the stylus and the record, and the extent to which the tone arm mass may be reduced in conventional pickups is limited because proper performance of the apparatus at low frequencies requires a relatively large tone arm mass. For this reason, some reproducing systems utilize a counterbalancing spring for reducing the force between the stylus and the record, but this expedient substantially increases the friction of the tone arm pivot. Also, to eliminate the effect known as rumble, which may be caused by resonance between the tone arm mass and the stylus suspension compliance, and to reduce sensitivity to external shock, viscous damping may be applied to the tone arm pivot, but a tone arm so compensated does not readily accommodate itself to warped or eccentric records. The foregoing difficulties, moreover, tend to be aggravated by the radial component of the drag force, which tends to move the stylus laterally on a record disc, either outwardly away from or inwardly toward the center of the disc, depending upon the location of the tone arm pivot point with respect to the point of engagement of the stylus on the record. This force component may cause the stylus to jump laterally on the record surface in response to disturbance of the tone arm, whether by the above-mentioned resonance or by slight external shock.

Accordingly, it is an object of the present invention to provide a new and improved phonograph reproducing apparatus which effectively overcomes the above-mentioned shortcoming of conventional apparatus.

Another object of the invention is to provide a phonograph pickup which completely eliminates resonance between the tone arm mass and the stylus suspension compliance without resorting to the application of viscous damping to the tone arm pivot.

A further object of the invention is to provide a phonograph pickup having high resistance to external shock and improved fidelity of reproduction.

Still another object of this invention is to provide a phonograph pickup including a tone arm of very small mass having good low frequency performance.

Still a further object of the invention is to provide a phonograph pickup with provision for insuring a very gentle, quiet engagement between the stylus, and the record, and for avoiding rattling of the stylus against the record.

These and other objects of the invention are attained by providing at the free end of a tone arm a coupling arrangement linking the tone arm to the record member. Preferably, the coupling arrangement has an element which slidably engages the record surface and has sufficient engaging force applied thereto to inhibit rapid lateral displacement with respect thereto, this element being linked to the tone arm to prevent relative lateral motion therebetween while permitting relative vertical motion with respect to the stylus. In one embodiment, this element is pivoted to the tone arm, and the record-engaging surface of the element normally depends below the tip of the stylus so as to engage the record member prior to the engagement by the stylus upon downward motion of the tone arm, and, in a particular form, a spring may urge the pivoted element downwardly with respect to the tone arm so as to apply a portion of the weight of the tone arm to the element. Alternatively, the record-engaging coupling element may be affixed to the tone arm and the cartridge pivotally attached thereto for motion in the vertical plane, and in either case, viscous damping may be applied between the pivoted member and the tone arm.

Further objects and advantages of this invention will be apparent from a reading of the following detailed description in conjunction with the accompanying drawings showing preferred embodiments, in which.

Figure 1:
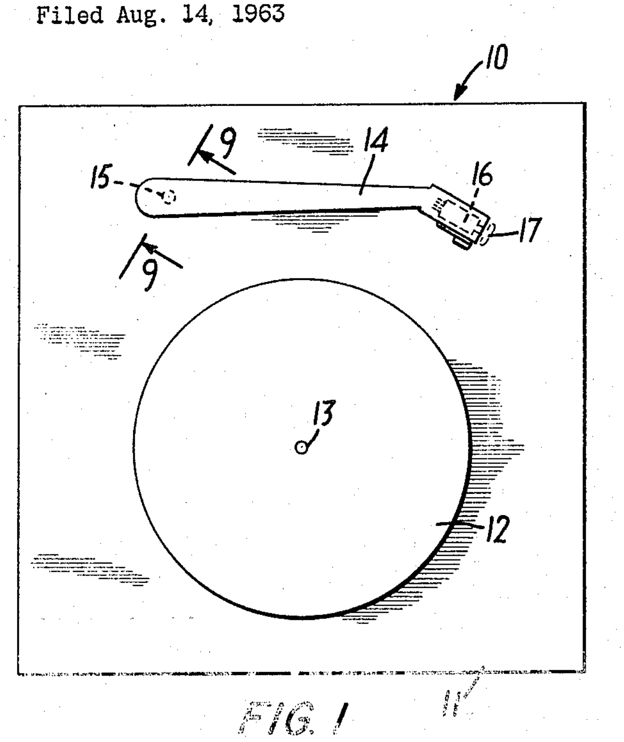
FIG. 1 is a plan view of a typical phonograph record reproducing apparatus in accordance with the invention.
Figure 2:
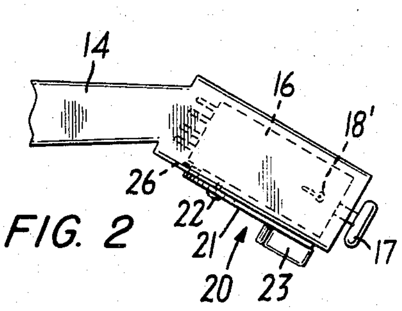
FIG. 2 is an enlarged fragmentary view showing the free end portion of the tone arm of FIG. 1.
Figure 3:
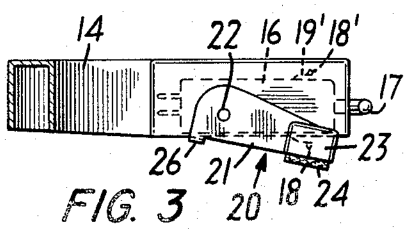
FIG. 3 is a side view of the tone arm portion shown in FIG. 2.

In the typical embodiment of the invention shown in FIGS. 1–3, a phonograph apparatus 10 comprises a base plate 11 upon which a turntable 12 having a central spindle 13 is mounted for rotation. The turntable, which may be driven in any conventional manner, is adapted to receive a phonograph record (not shown) centered by the spindle 13 in the usual way. Adjacent to the turntable, a pickup or tone arm 14 is mounted on the base plate 11 so as to allow rotation of the tone arm about a pivot 15, the axis of which is substantially vertical, thereby permitting the tone arm to move horizontally so as to follow the spiral groove of a record being reproduced. In addition, the tone arm is further pivoted in the usual manner to allow movement in a substantially vertical plane, i.e., toward and away from the base plate 11, so that the pickup stylus may be placed on and lifted off a record and to enable reproduction of warped records or of records in a stack where an automatic record changer is provided.

At the free end of the tone arm 14 remote from the pivot 15 there is a pickup cartridge 16 which may be removable from the tone arm and which, in the illustrated embodiment, is of the type rotatable by a knob 17 in order to present either of two stylii 18, 18' in accordance with the type of record to be reproduced, as is well known to the art, the styli being attached to the cartridge 16 by the usual stylus suspensions 19, 19'. As illustrated, the free end portion of the tone arm 14 containing the cartridge 16 may be disposed at an angle to the rest of the tone arm so as to extend parallel to the direction of the record groove engaged by the working stylus 18 at two points of the groove length. As is well known, this expedient reduces the tracking tangent error and, in the illustrated embodiment, this tracking error is further minimized by providing an "overhung" tone arm arrangement whereby an acute angle is formed between lines extending from the stylus to the spindle 13 and to the pivot point 15.

In accordance with the present invention, as best seen in FIGS. 2 and 3, a coupling arrangement 20 is provided at the free end of the tone arm 14 to link the tone arm directly to a phonograph record carried by the turntable 12. In this embodiment, the coupling arrangement 20 comprises an arm 21 supported on the side wall of tone arm 14 adjacent to the cartridge 16 by a pivot 22 so that the arm 21 is permitted to move only in a substantially vertical plane, i.e., in a plane substantially perpendicular to the surface of the record being played. The end of the arm 21 remote from the pivot 22 carries an element 23 of selected weight, for example, five grams, and the lower surface of this element is covered by a pad 24, made of felt, for example, and oriented to lie flat on the surface of a record upon engagement of the stylus 18 therewith. To damp the pivotal motion of the arm 21, a layer of viscous lubricant, such as a silicone oil, is preferably deposited between the opposed facing surfaces of the arm 21 and the tone arm 14, and, at the end of the arm 21 remote from the weighted element, a stop 26 is formed integrally with the arm 21. When the tone arm 14 is not in use, the force of gravity on the weighted element 23 causes the arm 21 to rotate until the stop 26 strikes the undersurface of the tone arm 14 so that the pad 24 normally rests below the horizontal plane which passes through the stylus 18.

The sub-assembly comprising the arm 21, the weight 23 and the pad 24 constitutes a coupling linkage which rides on the surface of the record being reproduced and which is viscous-coupled to the tone arm 14 so as to provide the tone arm with a stable base on the record itself, thereby effectively clamping the free end of the tone arm 14 and thus the cartridge 16 itself to the record. Preferably, the pad 24 engages the record surface substantially on a radius from the spindle 13 passing through the stylus 18, although a slight deviation from this location will not adversely affect the performance.

In operation, as the free end of the tone arm 14 descends toward a record mounted on the turntable 12, the pad 24, which normally rests below the stylus 18, engages the record surface before the stylus does, and, thereafter the layer of viscous lubricant between the arm 21 and the tone arm permits the stylus 18 to descend toward the record surface at a controlled rate. Once the element 23 has engaged the record surface, it clamps the tone arm thereto, tending to retain it in a laterally fixed position. Inasmuch as the arm 21 is permitted to move only in a substantially vertical plane with respect to the tone arm, the tone arm and cartridge are thereby effectively clamped against horizontal displacement with respect to the record, and due to the layer of viscous lubricant between the arm 21 and the tone arm 14, vibrations of the tone arm and cartridge in the vertical plane are attenuated. In addition, the viscous lubricant, by inhibiting rapid vertical motion of the tone arm with respect to the weighted element 23 and, consequently, the record surface, prevents the rattling of the stylus 18 against the record being engaged. By way of example, a silicone oil may be chosen which completely damps vibrations of the order of a few cycles per second or more, but offers low mechanical resistance to lower frequency vibrations so that there will be no difficulty in reproducing warped records.

Furthermore, a phonograph pickup employing a coupling linkage according to the invention will be entirely free from resonance between the effective mass at the free end of the tone arm and the stylus suspension compliance which typically occurs in the frequency range of 10–60 cycles per second. The phenomenon known as rumble is primarily attributable to tone arm resonance, and so the invention eliminates most of the rumble in present day disc phonograph reproduction systems. Also, the elimination of tone arm resonance significantly improves the stability of the tone arm since, in the absence of resonance, the free end of the tone arm is considerably less prone to jump on or skip across the record being reproduced.

The above-described clamping action of the coupling linkage 20 allows an additional improvement in shock resistance. In the past, a relatively large tone arm mass has been necessary to assure adequate low frequency performance. Since the weighted pad according to this invention clamps the cartridge 16 to the record, as explained above, the low frequency response is independent of the effective mass at the free end of the tone arm 14. This is an important achievement, since most of the instability of a tone arm is due to the inertia of the free end mass when the phonograph is subjected to external shock. The present invention allows a considerable reduction in the free end mass of the tone arm 14, providing a marked improvement in shock resistance.

The reduction in the tone arm free end mass also eliminates or reduces the need for a counterbalancing spring or weight, which has often been used in the past to reduce the force between the stylus 18 and the record and thereby to minimize wear of the stylus and record. Reduction of the counterbalancing force reduces the friction at the pivot 15 between the tone arm 14 and the base plate 11. Still another feature of the invention is that the pad 24, being mounted on the leading side of the cartridge 16 as shown in the drawings, in riding over a record, cleans the surface of the record presented to the stylus.

Figure 4:
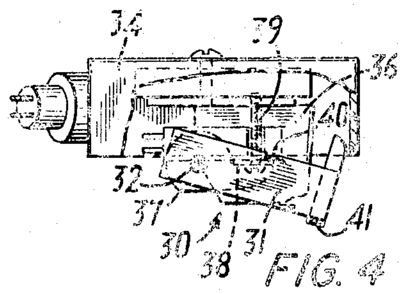
FIG. 4 is a side view, partly broken away, illustrating the free end portion of another tone arm according to the invention.
Figure 5:
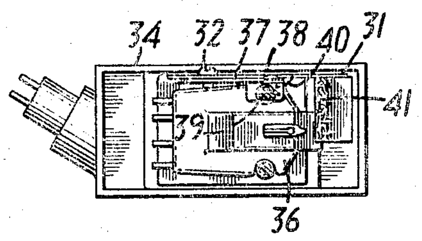
FIG. 5 is a bottom view of the embodiment shown in FIG. 4.

Another embodiment of the invention is shown in FIGS. 4 and 5 wherein a coupling linkage 30 includes an arm 31 pivotally attached by a screw 32 to a vertically disposed plate 37. The plate 37 has a flange 38 by which it is secured to a cartridge 36, for example by a screw 39 which secures the cartridge to a tone arm 34. In this instance, a layer of viscous lubricant is introduced between the opposed facing surfaces of the arm 31 and the plate 37, the above-described clamping action of the coupling linkage being applied directly to the cartridge 36 rather than through the tone arm. The arm 31 carries at its forward end a weighted pad 41, and a stop member 40 formed integrally with the arm 31 strikes the flange 38 so as to restrain the pad in the position illustrated in FIG. 4 when the tone arm is not in use. This type of mounting is best suited to replacement-type cartridges adapted to be mounted in conventional tone arms which are not provided with a coupling linkage of the type illustrated in FIGS. 2 and 3 and the assembly comprising the plate 37 and the arm 31 may also be conveniently added to conventional cartridge and tone arm arrangements.

Figure 6:
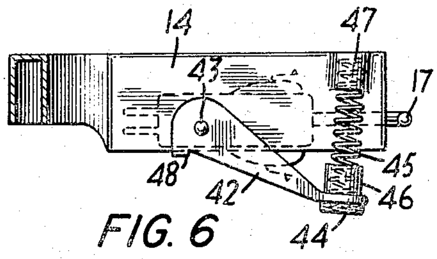
FIG. 6 is a side view showing still another tone arm arrangement according to the invention.

Another embodiment of the invention is shown in FIG. 6. Here the coupling linkage comprises an arm 42 attached by a pivot 43 to the tone arm 14 and having a pad 44 arranged to engage the record surface. In this case a light compression spring 45 extends from a receptacle 46 at the end of the arm 42 to a similar receptacle 47 mounted on the tone arm 14 and, as in the embodiments of FIGS. 1–3, a layer of viscous lubricant is inserted between the opposed facing surfaces of the arm 42 and the tone arm 14. A stop 48 on the arm 42 engages the tone arm 14 so as to limit the extent to which the spring 45 urges the pad 44 below the tone arm 14.

No appreciable added weight is required in the coupling linkage of this embodiment since the spring 45 transmits a portion of the weight of the tone arm 14 to the pad 44, thereby reducing the force resulting from the tone arm weight which acts between the stylus and the record. Accordingly, in this embodiment the weight of the tone arm 14, acting through the spring 45 and pad 44, effectively couples the tone arm to the record so as to eliminate the above-described tone arm resonance and improve the shock resistance in the same manner as in the embodiment of FIGS. 1–3. Similarly, the spring-mounted and viscous-coupled pad 44 assures a smooth, gentle engagement of the stylus with the record. Care must be taken not to reduce the free end weight of the tone arm too much, however, or the proportion of that weight resting on the pad 44 may be insufficient to avoid the generation of a low frequency noise apparently caused by the integrated displacements of the several segments of the record groove engaged by the pad. In the foregoing embodiments this problem is not present, since the weight of the element 23 assures the attenuation of these integrated groove displacements.

Figure 7:
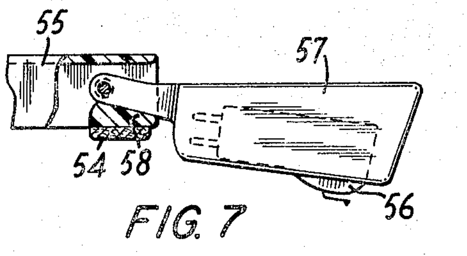
FIG. 7 is a side view showing still a further embodiment of the invention.

A further embodiment of the invention is shown in FIG. 7. Here a pad 54 is rigidly attached to the undersurface of a tone arm 55, and a cartridge 56 is mounted in a housing 57, which is pivotally attached to the end of the tone arm to allow movement of the cartridge only in a substantially vertical plane, a viscous lubricant being inserted between opposed facing surfaces of the tone arm 55 and the housing 57. To limit the downward travel of the housing 57 when the pickup is not in use, a stop 58 is mounted within the end of the tone arm. As in the embodiments previously described, the coupling linkage between the record and the cartridge, comprising, in this case, the pad 54 and the pivoted housing 57, clamps the cartridge to the record so as to eliminate rumble, shock sensitivity, and tone arm resonance.

Figure 8:
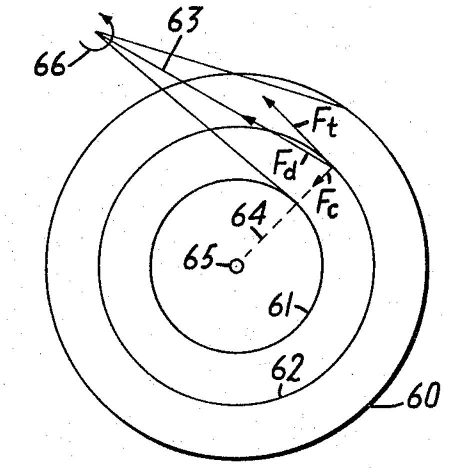
FIG. 8 is a diagram illustrating the drag forces acting upon a record being reproduced.

In the diagram of FIG. 8, which illustrates the drag forces acting upon a phonograph disc during reproduction, an outer circle 60 represents the maximum diameter of the groove of a record being reproduced, an inner circle 61 designates the minimum diameter of the groove, and an intermediate circle 62 indicates the median diameter of the groove. A tone arm of the type described above, in position to reproduce the median portion of the groove, is represented by line 63. Both the pickup stylus and the coupling linkage pad exert a drag force on the record, but the pad exerts considerably more drag than does the stylus, since the vertical force applied to the stylus is preferably less than that on the pad, and the area of contact between the pad and the record is considerably greater than that between the stylus and the record.

The drag force exerted by the pad (and the stylus, whose contribution is relatively slight) acts along the line 63, and its magnitude is indicated in the drawing by a vector $F_d$. This force may be resolved into two perpendicular component forces, one acting tangent to the circle 62 where the pad contacts the record represented by a vector $F_t$, and the other, designated by a vector $F_c$, directed along a radius 64 passing through the center 65. In the "overhung" tone arm arrangement, which minimizes the tracking tangent error, the angle between the line 63 and the radius 64 is acute, and the drag force component $F_c$ is directed toward the center of the record as shown in FIG. 8, and with the optimum overhang arrangement for reducing tracking tangent error, the magnitude of the laterally directed drag force component acting on the tone arm, represented by the vector $F_c$, is more nearly constant throughout the range of tone arm positions than with other tone arm arrangements.

Accordingly, if the laterally directed drag force component is balanced by a constant oppositely directed force, the net lateral force acting upon the free end of the tone arm will be substantially zero in all tone arm positions. This may be done, for example, by providing a highly compliant coil spring (not shown) around the pivot axis 15 coupling the tone arm 14 to the base plate 11 (FIG. 1) so as to provide an outwardly directed torque represented by the arrow 66 in FIG. 8.

Figure 9:
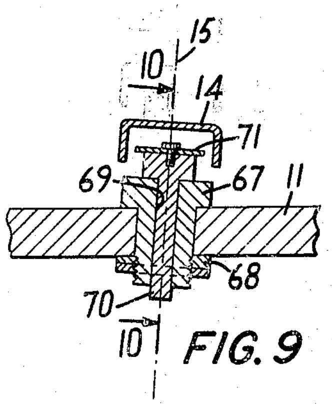
FIG. 9 is an enlarged fragmentary view in section taken along the line 9—9 of FIG. 1 and looking in the direction of the arrows, illustrating the tone arm support arrangement.
Figure 10:
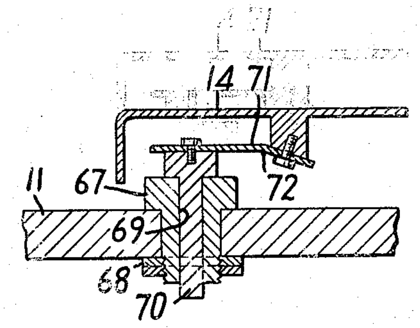
FIG. 10 is a sectional view taken along the line 10—10 of FIG. 9 and looking in the direction of the arrows.

Another method of balancing the force $F_c$ comprises tilting the pivot axis 15 several degrees from the vertical according to the technique described in Patent No. 2,647,753 issued August 4, 1953. In this technique, as shown in FIGS. 9 and 10, a bushing 67 is secured to the horizontal base plate 11 by means of a wedge-shaped washer 68 so that the axis of the central cylindrical aperture 69 of the bushing is inclined slightly from the vertical. A pivot shaft 70, which is rotatable in the aperture 69, carries one end of a flat metallic leaf spring 71, the other end of which is attached to the tone arm 14 so that the leaf spring is flexed at a point 72 when the tone arm is in position to reproduce a record. The direction in which the pivot axis 15 is tilted is preferably perpendicular to the line 63 in FIG. 8 and away from the center 65, and the magnitude of the tilt is selected in accordance with the free end weight of the tone arm to exactly balance the force $F_c$ acting laterally in the opposite direction on the tone arm when it is in position to reproduce the median groove portion 62. Inasmuch as $F_c$ is substantially the same for all tone arm positions and the balancing force resulting from tilting likewise does not vary to any great extent, the two forces will substantially cancel at all tone arm positions, leaving the tone arm unaffected by lateral forces during operation.

Figure 11:
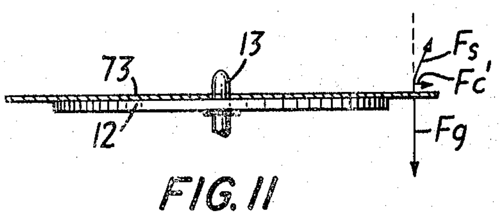
FIG. 11 is a diagram illustrating certain forces acting upon a tone arm supported in the manner of FIGS. 9 and 10.

In this regard, FIG. 11 shows the forces acting on the tone arm 14 when it is resting on a record 73 which is not being rotated, the force of gravity being designated as $F_g$. The force exerted by the flexed leaf spring designated as $F_s$, may be resolved into two mutually perpendicular components, one (not shown) acting vertically and in opposition to the gravity force $F_g$, and the other, acting parallel to the surface of the record and away from the spindle 13, designated as $F_c'$. The design parameters, as pointed out above, are so chosen that $F_c'$ balances $F_c$ when the tone arm 14 is in position to reproduce the median groove portion 62.

Figure 12:
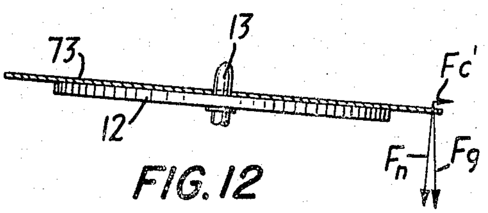
FIG. 12 is a diagram illustrating certain forces acting upon a tone arm when the record member is tilted slightly from the horizontal.

An alternative technique for balancing the centrally directed drag force component $F_c$ is to tilt the turntable 12 a few degrees from the horizontal so that, as shown in FIG. 12, the gravity force $F_g$ may be resolved into components $F_n$ normal to the record surface and $F_c'$ parallel to this surface. Here again the direction of turntable tilt should be perpendicular to the line 63 as before, but if for aesthetic or other considerations the turntable (or base plate) is tilted about a major axis of the base plate, the amount of overhang of the tone arm may be varied to achieve the desired force $F_c'$.

In either case, the degree of tilt of the turntable 12 or of the pivot axis 15 is a function of the total weight of the tone arm 14, the cartridge 16, and the coupling linkage 20, and the drag force component $F_c$ to be balanced. The force $F_c$ in turn depends upon the force bearing upon the pad 24, the pad material, the surface area of the pad in contact with the record, and the speed at which the record is revolved. The mass chosen for the weighted element 23 or the force of the spring 45 thus determines the centrally directed drag force component to be balanced, and yet must be sufficient to attenuate the above-mentioned low frequency noise apparently caused by the integrated groove displacements acting upon the pad 24.

Although this invention has been described with reference to specific embodiments, modifications and variations will readily occur to those skilled in the art. Therefore, the invention is not to be construed as limited to the specific embodiments described, but all such variations and modifications are included within the intended scope of the invention as defined by the following claims.

I claim:

1. Phonograph record reproducing apparatus comprising base means, turntable means mounted on the base means for driving a record to be reproduced, tone arm means pivotally mounted on the base means and having a free end, stylus support means at the free end of the tone arm means, coupling means linked to the stylus support means for motion with respect thereto in a substantially vertical plane and adapted to engage the surface of a phonograph record engaged by any stylus in the stylus support means to couple the stylus support means to the record, and means for damping relative vertical motion between the coupling means and the stylus support means.

2. Apparatus according to claim 1 wherein the coupling means comprises an arm linked to the tone arm means for pivotal motion with respect thereto in a substantially vertical plane and wherein the damping means comprises viscous damping means between the pivoted arm and the tone arm means.

3. Apparatus according to claim 1 wherein the coupling means comprises pad means for engaging the surface of a record adjacent to the stylus support means, and means linking the pad means and the stylus support means preventing relative motion in the horizontal direction therebetween.

4. Apparatus according to claim 1, together with means for imparting to the tone arm means a force tending to compensate for any component perpendicular thereto of drag force produced by sliding friction on the phonograph record surface.

5. Apparatus according to claim 4 wherein the tone arm means is of the overhung type so as to provide a relatively constant lateral drag force component thereon in one lateral direction and including means for imparting a substantially constant compensating lateral force to the tone arm means in the opposite lateral direction thereof.

6. Apparatus according to claim 4 wherein the means for imparting a compensating force comprises spring means acting between the base means and the tone arm means so as to urge the tone arm means outwardly away from the center of the turntable means.

7. Apparatus according to claim 4 wherein the means for imparting a compensating force comprises tilted pivot means mounting the tone arm means for pivotal motion in a plane extending at an angle to the plane of the turntable means.

8. Apparatus according to claim 4 wherein the means for imparting a compensating force comprises means supporting the turntable means at an angle to the horizontal.

9. Apparatus according to claim 3 including weight means having a mass of selected magnitude attached to the pad means to press the pad means against a record surface.

10. Apparatus according to claim 3 including spring means acting between the pad means and the stylus support means to urge the pad means against a record surface.

11. Apparatus according to claim 3 wherein the means linking the pad means to the stylus support means comprises an arm pivotally connected to the stylus support means arranged to normally position the pad means below the plane of a stylus in the stylus support means in the inactive condition of the tone arm means.

12. Apparatus according to claim 3 wherein the pad means is affixed to the tone arm means and the means linking the pad means to the stylus support means comprises a pivoted connection between the tone arm means and the stylus support means.

13. Apparatus according to claim 3 wherein the pad means is positioned so as to engage a portion of a record surface in advance of a stylus mounted in the stylus support means with respect to the direction of relative motion of a record with respect to the stylus.

14. In apparatus for reproducing phonograph records, the combination comprising stylus support means for supporting a reproducing stylus, and coupling means linked to the stylus support means and adapted to engage the surface of a phonograph record engaged by any stylus in the stylus support means so as to couple the stylus support means to the record, the coupling means including an arm linked to the stylus support means for pivotal motion with respect thereto in a substantially vertical plane, means for damping the pivotal motion of the pivoted arm, and pad means for engaging the surface of the record adjacent to the stylus support means to inhibit rapid lateral displacement with respect to the record surface, the pivoted arm linking the pad means to the stylus support means to prevent relative motion in the horizontal direction therebetween.

15. The combination according to claim 14 wherein the stylus support means comprises pickup cartridge means and the coupling means is pivotally attached to the cartridge means.

16. The combination according to claim 14 wherein the stylus support means includes a tone arm and wherein the pivoted arm is pivotally attached to the tone arm.

17. A coupling linkage for phonograph record reproducing apparatus comprising a support member adapted to be connected to a stylus support means, a coupling member movable in a substantially vertical plane with respect to the support member when the support member is connected to the stylus support means, the coupling member having pad means adapted to engage the surface of a phonograph record engaged by a stylus in the stylus support means to inhibit rapid lateral displacement with respect to the record surface so as to couple the stylus support means to the record and to prevent relative motion in the horizontal direction between the stylus support means and the pad means, and means for damping relative motion between the coupling member and the support member.

18. A coupling linkage according to claim 17 wherein the damping means comprises viscous damping means acting between the support member and the coupling member.

19. Phonograph record reproducing apparatus comprising base means, turntable means mounted on the base means for driving a record to be reproduced, tone arm means pivotally mounted on the base means and having a free end, stylus support means at the free end of the tone arm means, pad means linked to the stylus support means for motion with respect thereto in a substantially vertical plane and adapted to engage the surface of a phonograph record engaged by any stylus in the stylus support means to inhibit rapid lateral displacement with respect to the record surface and to couple the stylus support means to the record, means linking the pad means and the stylus support means preventing relative motion in the horizontal direction therebetween, and means for damping relative vertical motion between the pad means and the stylus support means.

References Cited by the Examiner

UNITED STATES PATENTS

| | | | |
|---|---|---|---|
| 2,259,275 | 10/1941 | Stone | 274—25 X |
| 2,262,503 | 11/1941 | Kierulff | 274—25 |
| 2,418,617 | 4/1947 | Bessire | 274—25 X |
| 2,572,712 | 10/1951 | Fisher | 179—100.41 |
| 2,647,753 | 8/1953 | Goldmark | 274—23 |
| 2,716,551 | 8/1955 | Bachman | 274—24 |
| 2,958,529 | 11/1960 | King | 274—1 X |
| 3,088,742 | 5/1963 | Alexandrovich | 274—23 |
| 3,226,124 | 12/1965 | Peterson | 274—24 |

FOREIGN PATENTS

| | | |
|---|---|---|
| 260,626 | 8/1949 | Switzerland. |

OTHER REFERENCES

Proceedings of the I.R.E., "The Application of Damping to Phonograph Reproducer Arms," pages 133–137, February 1952.

JOHN M. HORAN, *Primary Examiner.*

J. F. PETERS, *Assistant Examiner.*

NORTON ANSHER, *Examiner.*